US011076685B2

(12) United States Patent
Miller et al.

(10) Patent No.: US 11,076,685 B2
(45) Date of Patent: Aug. 3, 2021

(54) TECHNIQUES FOR IMPROVING USAGE OF PERSONAL CARE DEVICES THROUGH BEHAVIOR TRACKING

(71) Applicant: L'Oreal, Paris (FR)

(72) Inventors: Zane Bowman Allen Miller, Seattle, WA (US); Jeffrey Kissinger, Kirkland, WA (US); Geoffrey F. Deane, Bellevue, WA (US)

(73) Assignee: L'Oreal, Paris (FR)

( * ) Notice: Subject to any disclaimer, the term of this patent is extended or adjusted under 35 U.S.C. 154(b) by 29 days.

(21) Appl. No.: 16/452,276

(22) Filed: Jun. 25, 2019

(65) Prior Publication Data

US 2020/0405047 A1      Dec. 31, 2020

(51) Int. Cl.
| | | |
|---|---|---|
| *A46B 15/00* | (2006.01) | |
| *H04L 29/08* | (2006.01) | |
| *A47K 7/04* | (2006.01) | |
| *G06Q 30/02* | (2012.01) | |
| *A46B 13/06* | (2006.01) | |

(52) U.S. Cl.
CPC .......... *A46B 15/0002* (2013.01); *A46B 13/06* (2013.01); *A47K 7/04* (2013.01); *G06Q 30/0207* (2013.01); *H04L 67/22* (2013.01); *A46B 2200/1006* (2013.01)

(58) Field of Classification Search
CPC ............... A46B 15/0002; A46B 13/06; A46B 2200/1006; A47K 7/04; G06Q 30/0207; H04L 67/22
See application file for complete search history.

(56) References Cited

U.S. PATENT DOCUMENTS

| | | | |
|---|---|---|---|
| 9,757,065 B1* | 9/2017 | Suri | .................... A46B 15/0006 |
| 2010/0281636 A1* | 11/2010 | Ortins | .................. A46B 15/001 15/4 |
| 2017/0367543 A1* | 12/2017 | Straka | ................. A46B 15/0008 |
| 2019/0236465 A1* | 8/2019 | Vleugels | ................ G16H 20/17 |

FOREIGN PATENT DOCUMENTS

WO    WO-2014016718 A1 *   1/2014    .......... A61C 17/221

\* cited by examiner

*Primary Examiner* — Joseph H Feild
*Assistant Examiner* — Sharmin Akhter
(74) *Attorney, Agent, or Firm* — Christensen O'Connor Johnson Kindness PLLC (57) ABSTRACT

In some embodiments, usage of a personal care device in compliance with a recommended use is improved. A usage monitor computing device may detect and store records of use of the personal care device. The usage monitor computing device may transmit the records of use to a monitoring server device via a network. The usage monitor computing device may determine whether the records of use indicate that the personal care device has been used as directed by the recommendations, and if so, may determine whether one or more rewards for use should be provided to the user. The usage monitor computing device may receive notifications of the rewards, and may present notifications of the rewards to the user.

16 Claims, 8 Drawing Sheets

TECHNIQUES FOR IMPROVING USAGE OF PERSONAL CARE DEVICES THROUGH BEHAVIOR TRACKING

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for guiding use of a personal care device to improve treatment effectiveness is provided. The system comprises a personal care device, a usage monitor computing device, and a monitoring server device. The personal care device is communicatively coupled to the usage monitor computing device. The usage monitor computing device is communicatively coupled to the monitoring server device. The monitoring server device is configured to receive a usage record from the usage monitor computing device, wherein the usage record includes information regarding a detected operation of a treatment application device of the personal care device; store the usage record in a usage data store; review a plurality of usage records stored in the usage data store to determine if a reward threshold has been met; and, in response to determining that the reward threshold has been met, transmit a notification of a reward to the usage monitor computing device for presentation.

In some embodiments, a method of guiding use of a personal care device to improve treatment effectiveness is provided. A usage record is received that includes information regarding a detected operation of a treatment application device of the personal care device. A reward is determined based on the usage record. An indication of the reward is presented.

In some embodiments, a usage monitor computing device is provided. The usage monitor computing device comprises a display device; circuitry for receiving a usage record that includes information regarding a detected operation of a treatment application device of a personal care device; circuitry for transmitting the usage record to a monitoring server device; circuitry for receiving a notification of a reward based on the usage record from the monitoring server device; and circuitry for presenting an indication of the reward on the display device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Personal care devices are increasingly helping people improve their daily routines, whether it is for skincare, dental care, or other personal care tasks. However, personal care devices are most effective when used as recommended by the manufacturer, and sub-optimal results may be obtained if they are used in other ways. For example, a recommended skincare regimen using a personal care device may include 60 seconds of use twice a day to obtain maximum benefits, and using the personal care device only intermittently or for less than 60 seconds at a time may not provide the full benefits of use. What is desired are devices and techniques that can help guide and encourage use according to the optimal use recommendations.

Figure 1:
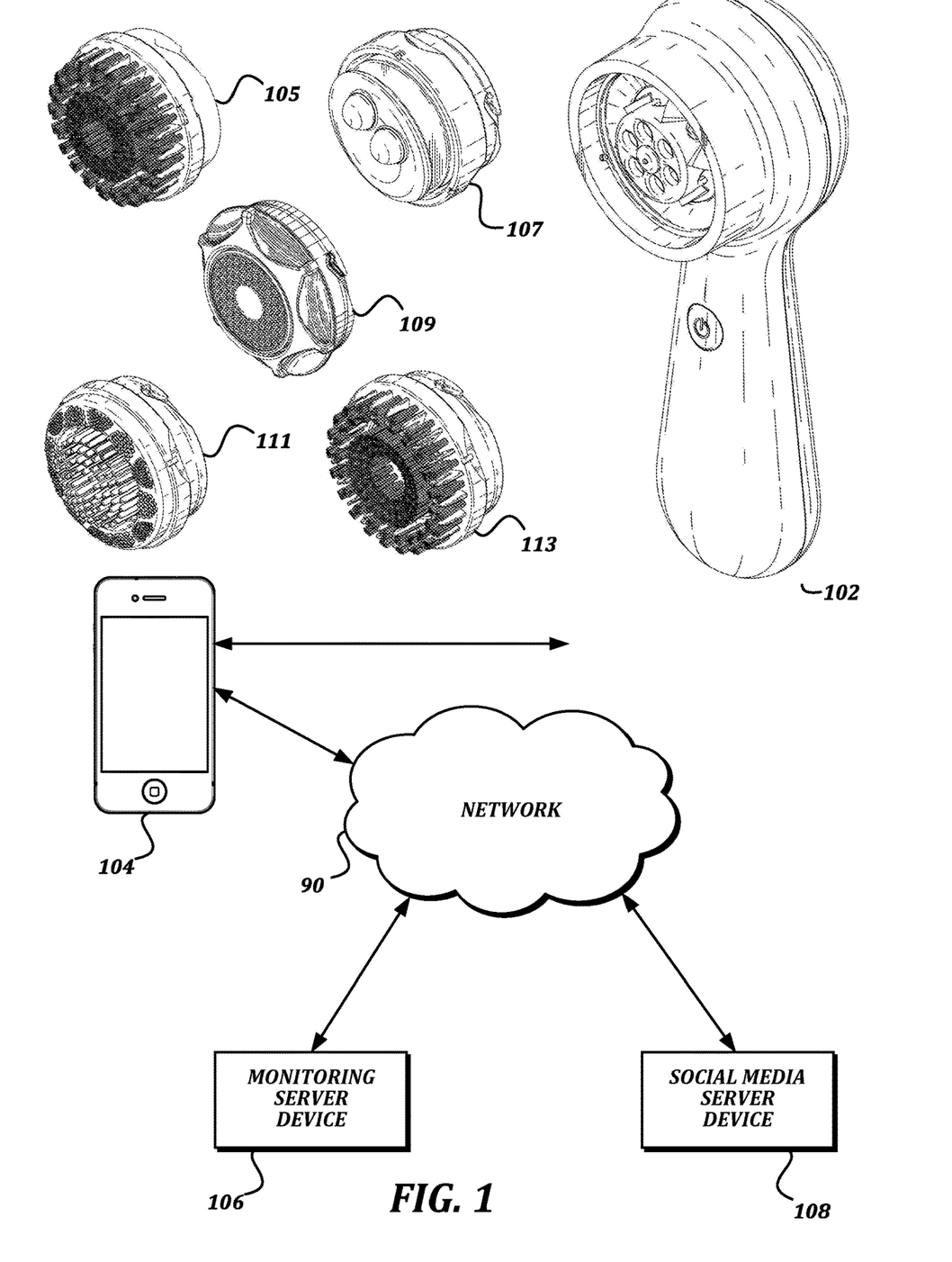
FIG. 1 is a schematic diagram that illustrates a system for improving usage of a personal care device according to various aspects of the present disclosure.

FIG. 1 is a schematic diagram that illustrates a system for improving usage of a personal care device according to various aspects of the present disclosure. In the illustrated embodiment, the system includes a personal care device 102 that may be coupled with a variety of attachments, including but not limited to the illustrated daily use cleaning brush head 105, an eye massaging head 107, a foundation makeup brush head 109, an exfoliating head 111, and a sensitive skin brush head 113. The illustrated system also includes a usage monitor computing device 104.

The personal care device 102 communicates with the usage monitor computing device 104 to provide records of the use of the personal care device 102. The usage monitor computing device 104 transmits the records of the use to a monitoring server device 106 via a network 90, which may include any suitable type of networking technology, including but not limited to wireless technologies such as Wi-Fi, WiMAX, 2G, 3G, 4G, LTE, and Bluetooth; and wired technologies such as Ethernet, USB, FireWire, and the Internet. The monitoring server device 106 determines whether the records of use indicate that the personal care device 102 has been used as directed by the recommendations, and if so, determines whether one or more rewards for use should be provided to the user. The monitoring server device 106 may transmit notifications of the reward to the usage monitor computing device 104, and/or may post notifications of the reward to a social media server device 108. Further description of various embodiments of each of these components of the system is provided below.

Figure 2:
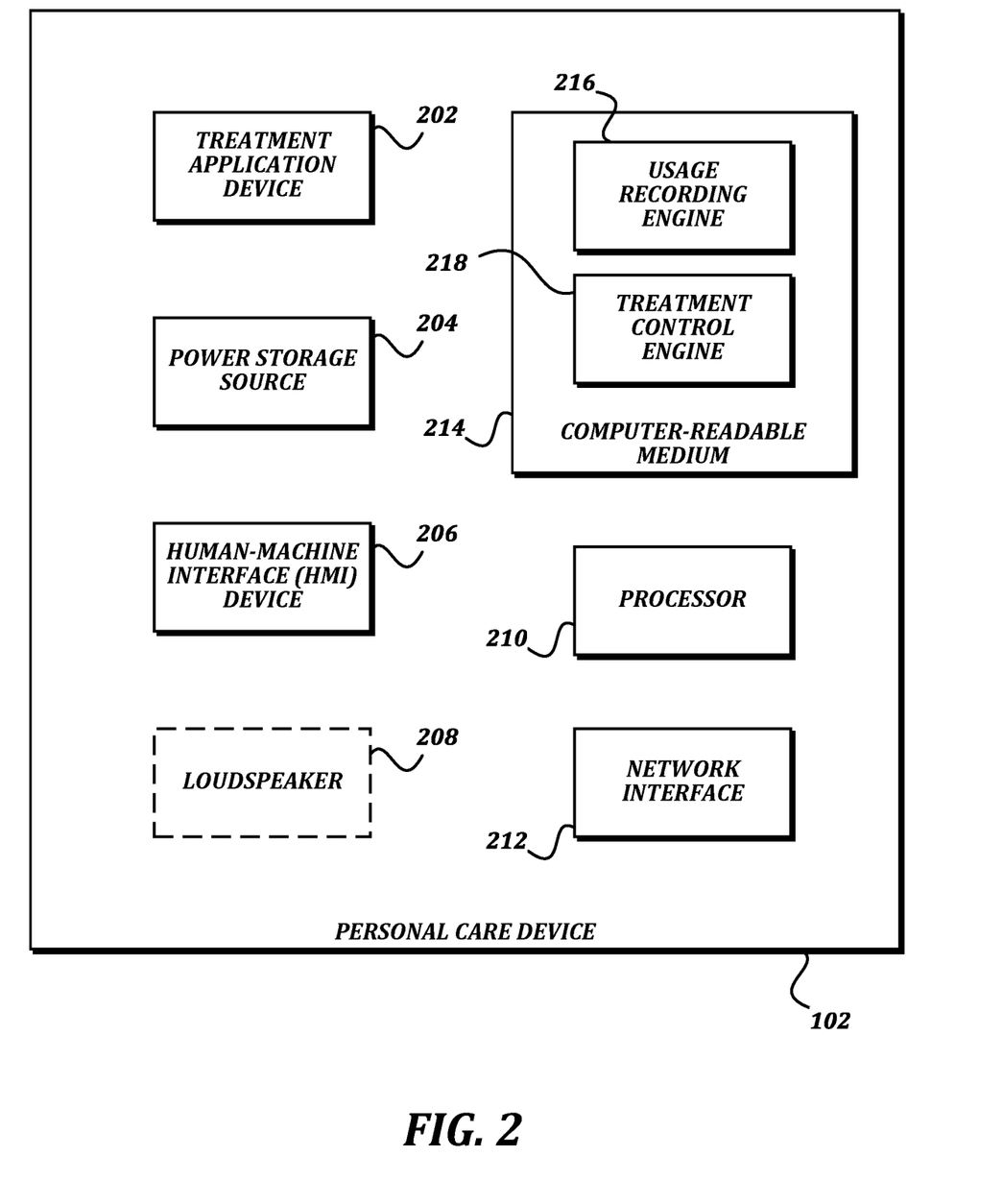
FIG. 2 is a block diagram that illustrates components included in an example embodiment of a personal care device according to various aspects of the present disclosure.

FIG. 2 is a block diagram that illustrates components included in an example embodiment of a personal care device according to various aspects of the present disclosure. In some embodiments, the personal care device 102 is any type of powered device that can be used as part of a daily personal care routine. One non-limiting example of a personal care device 102 is a powered brush with a removable head that oscillates, rotates, or otherwise moves in order to perform a scrubbing action. Another non-limiting example of a personal care device 102 is a handheld light-emitting device that may be used to expose skin to light to achieve therapeutic benefits.

In the illustrated embodiment, the personal care device 102 includes a treatment application device 202, a power storage source 204, a human-machine interface device 206, an optional loudspeaker 208, a processor 210, a network interface 212, and a computer-readable medium 214.

In some embodiments, the treatment application device 202 includes one or more devices that collectively apply a treatment to a user. For example, if the personal care device 102 is a powered brush, the treatment application device 202 may include a drive motor, an armature coupled to the drive motor that accepts a detachable brush head, and the brush head itself. As another example, if the personal care device 102 is a handheld light-emitting device, the treatment application device 202 may include one or more light-emitting diodes (LEDs), lasers, or other light-emitting devices.

In some embodiments, the power storage source 204 is a device, such as a rechargeable battery, that provides power to the treatment application device 202 for operation. In some embodiments, the power storage source 204 may also provide power for operation to the other components of the personal care device 102. In some embodiments, instead of a power storage source 204, the personal care device 102 may be coupled to an external power source, such as a wall power outlet.

In some embodiments, the human-machine interface (HMI) device 206 is any type of device capable of being actuated by a user to generate a signal. Some non-limiting examples of HMI devices 206 include a push-button switch, a toggle switch, a capacitive switch, a rotary switch, a slide switch, and a rocker switch. In some embodiments, the optional loudspeaker 208 may be included in order to allow the personal care device 102 to present audio content.

In some embodiments, the processor 210 is configured to execute computer-executable instructions stored on the computer-readable medium 214. The processor 210 may also be configured to receive and transmit signals to and/or from the other components of the personal care device 102 via a communication bus or other circuitry. In some embodiments, the network interface 212 is configured to transmit and receive signals to and from the usage monitor computing device 104 on behalf of the processor 210. The network interface 212 may implement any suitable networking technology, including but not limited to short-range wireless technologies such as Bluetooth, infrared, near-field communication, and Wi-Fi; long-range wireless technologies such as WiMAX, 2G, 3G, 4G, and LTE; and wired technologies such as USB, FireWire, and Ethernet. In some embodiments, the computer-readable medium 214 is any type of computer-readable medium on which computer-executable instructions may be stored, including but not limited to a flash memory, a ROM, an EPROM, an EEPROM, and an FPGA. In some embodiments, the computer-readable medium 214 and the processor 210 may be combined into a single device, such as an ASIC, or the computer-readable medium 214 may include a cache memory, a register, or another component of the processor 210.

In the illustrated embodiment, the computer-readable medium 214 has computer-executable instructions stored thereon that, in response to execution by the processor 210, cause the personal care device 102 to provide a usage recording engine 216 and a treatment control engine 218. In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines, or can be divided into sub engines. The engines can be stored in any type of computer readable medium or computer storage device and be stored on and executed by one or more general purpose computers, thus creating a special purpose computer configured to provide the engine or the functionality thereof.

In some embodiments, the treatment control engine 218 detects actuation of the HMI device 206, and activates the treatment application device 202 in response. The treatment control engine 218 may then detect a subsequent actuation of the HMI device 206 and deactivate the treatment application device 202 in response, or may allow the treatment application device 202 to operate for a predetermined amount of time before automatically deactivating the treatment application device 202. In some embodiments, the usage recording engine 216 detects when the treatment application device 202 is activated, creates usage records that record descriptions of the activations of the treatment application device 202, and stores the usage records for transmission via the network interface 212.

Further details of the functionality of the components of the personal care device 102 are provided below.

Figure 3:
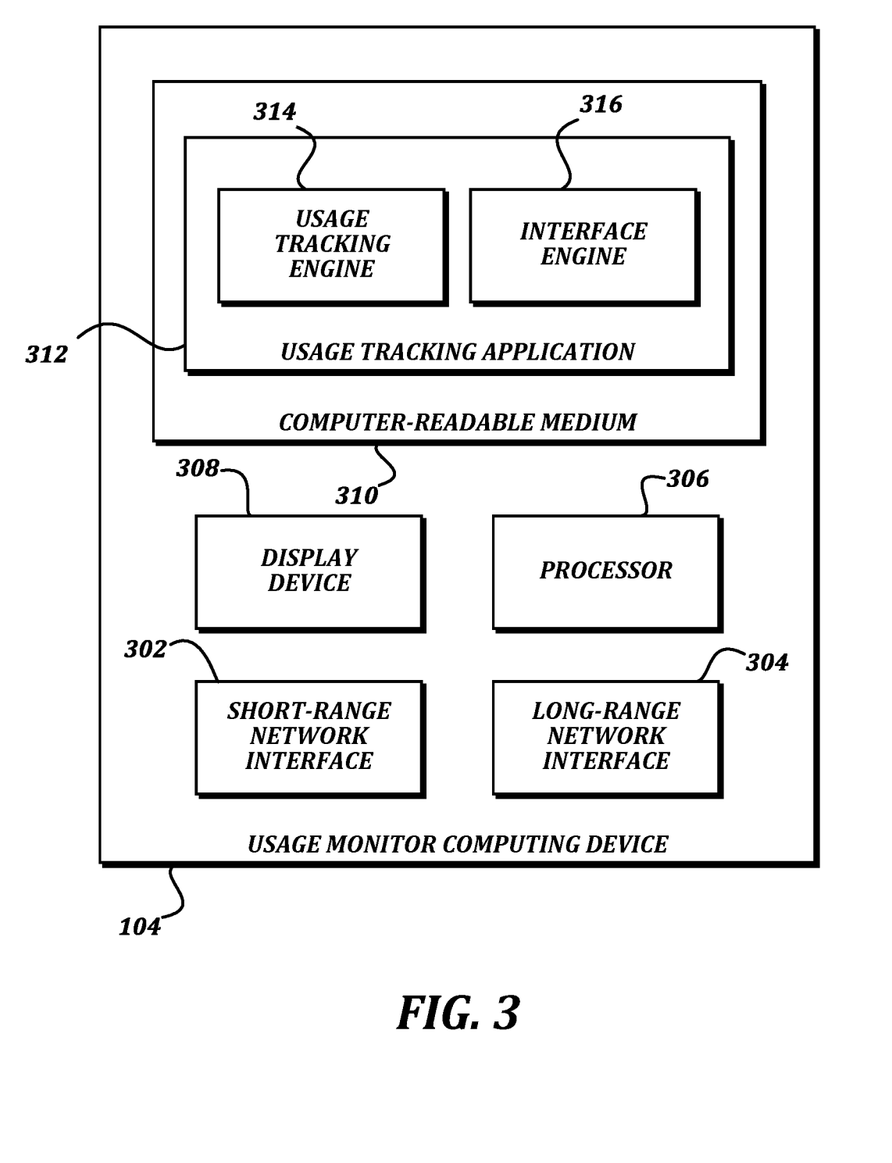
FIG. 3 is a block diagram that illustrates components included in an example embodiment of a usage monitor computing device according to various aspects of the present disclosure.

FIG. 3 is a block diagram that illustrates components included in an example embodiment of a usage monitor computing device according to various aspects of the present disclosure. The usage monitor computing device 104 may be a computing device of any form factor that is capable of communicating with the personal care device 102 and the monitoring server device 106, and of performing the other actions described herein as being performed by the usage monitor computing device 104. In some embodiments, the usage monitor computing device 104 may be a mobile computing device such as a smartphone or a tablet computing device. In some embodiments, the usage monitor computing device 104 may be a desktop computing device or a laptop computing device.

In the illustrated embodiment, the usage monitor computing device 104 includes a short-range network interface 302, a long-range network interface 304, a processor, a display device 308, and a computer-readable medium 310.

In some embodiments, the short-range network interface 302 is configured to transmit and receive signals to and from the personal care device 102 on behalf of the processor 306. The short-range network interface 302 may implement any suitable networking technology, and implements a complementary technology to that implemented by the network interface 212 of the personal care device 102. In some embodiments, the long-range network interface 304 is configured to transmit and receive signals to and from the monitoring server device 106 on behalf of the processor 306. The long-range network interface 304 may implement any suitable networking technology capable of communicatively coupling the usage monitor computing device 104 to the monitoring server device 106, including but not limited to wired technologies such as Ethernet, USB, and FireWire; and wireless technologies such as Wi-Fi, WiMAX, 2G, 3G, 4G, LTE, Bluetooth, infrared, and NFC. The short-range network interface 302 and the long-range network interface 304 are described as "short range" and "long range" for convenience only, and these descriptors should not be seen as limiting with respect to the relative distances between the personal care device 102, the usage monitor computing device 104, and the monitoring server device 106.

In some embodiments, the display device 308 is configured to present one or more graphical user interfaces, including but not limited to a graphical user interface generated by the usage tracking application 312. In some embodiments, the display device 308 may also be configured to receive inputs from a user, such as a touchscreen device.

In some embodiments, the processor 306 is configured to execute computer-executable instructions stored on the computer-readable medium 310. The processor 306 may also be configured to receive and transmit signals to and/or from the other components of the usage monitor computing device 104 via a communication bus or other circuitry.

In some embodiments, the computer-readable medium 310 has computer-executable instructions stored thereon that, in response to execution by the processor 306, cause the usage monitor computing device 104 to provide a usage tracking application 312. The computer-readable medium 310 may be any suitable type of computer-readable medium 310, including but not limited to flash memory, a hard disk drive, or any other type of non-transitory computer-readable medium.

In some embodiments, the usage tracking application 312 may be installed on the usage monitor computing device 104 after being downloaded from an app store or other distribution point. In some embodiments, the usage tracking application 312 may be a web-based application, and components may be downloaded and executed within a web browser or other thin interface installed on the usage monitor computing device 104.

In the illustrated embodiment, the usage tracking application 312 includes a usage tracking engine 314 and an interface engine 316. In some embodiments, the usage tracking engine 314 receives usage records from the personal care device 102, and transmits the usage records to the monitoring server device 106. In some embodiments, the interface engine 316 generates a graphical user interface to be presented via the display device 308. The graphical user interface may be used to present, apply, or otherwise manage rewards earned based on the usage records.

Further details of the functionality of the components of the usage monitor computing device 104 are provided below.

Figure 4:
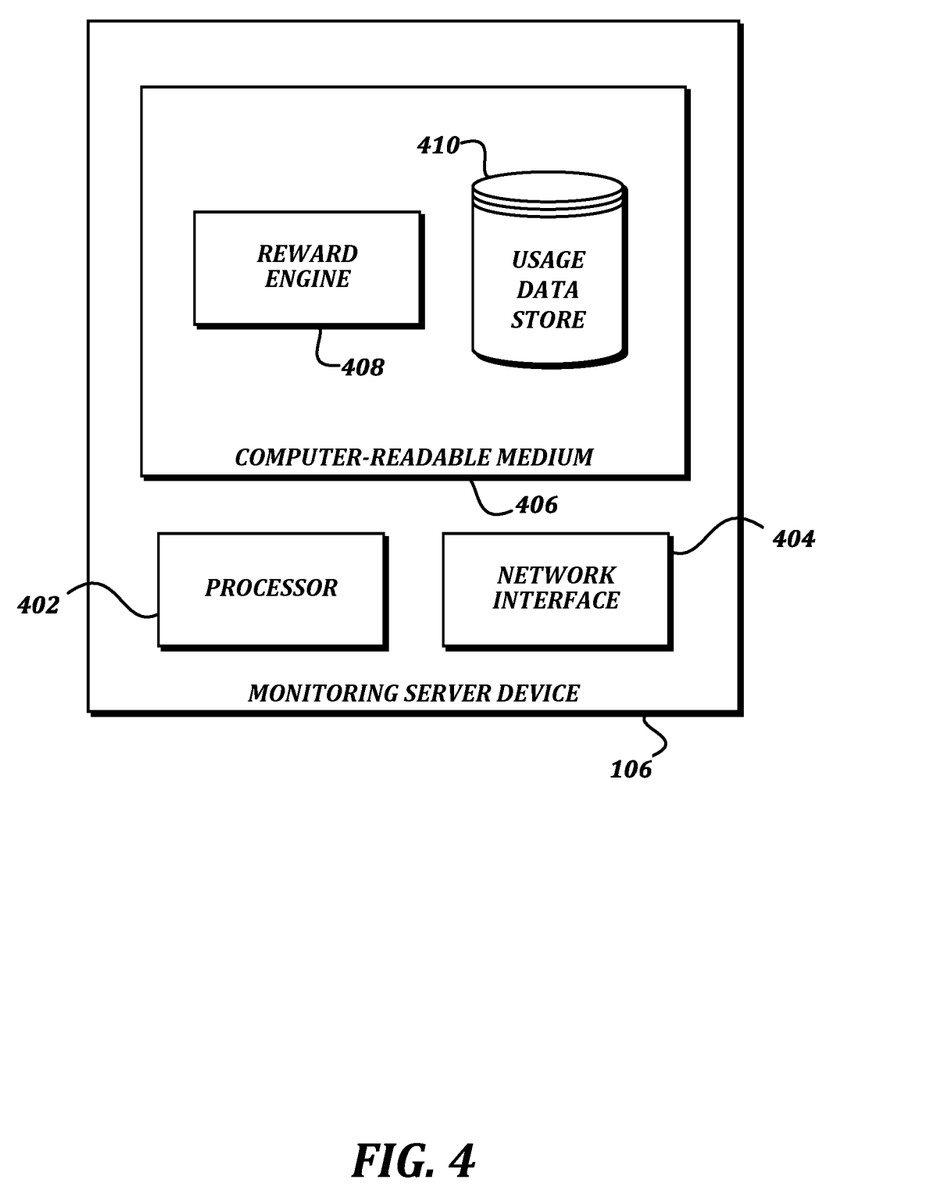
FIG. 4 is a block diagram that illustrates components included in an example embodiment of a monitoring server device according to various aspects of the present disclosure.

FIG. 4 is a block diagram that illustrates components included in an example embodiment of a monitoring server device according to various aspects of the present disclosure. In some embodiments, the monitoring server device 106 is a server computing device, a cloud-based server, or cloud-based service that receives usage records and provides rewards based thereon.

In the illustrated embodiment, the monitoring server device 106 includes a processor 402, a network interface 404, and a computer-readable medium 406. In some embodiments, the processor 402 is configured to execute computer-executable instructions stored on the computer-readable medium 406. The processor 402 may also be configured to receive and transmit signals to and/or from the other components of the monitoring server device 106 via a communication bus or other circuitry. In some embodiments, the network interface 404 is configured to transmit and receive signals to and from the usage monitor computing device 104. Any suitable communication technology that is complementary to the communication technology implemented by the long-range network interface 304 of the usage monitor computing device 104.

In some embodiments, the computer-readable medium 406 has computer-executable instructions stored thereon that, in response to execution by the processor 402, cause the monitoring server device 106 to provide a reward engine 408. In some embodiments, the computer-readable medium 406 also stores at least part of a usage data store 410. In some embodiments, the reward engine 408 is configured to usage records via the network interface 404, and stores the usage records in the usage data store 410. In some embodiments, the reward engine 408 is configured to review usage records stored in the usage data store 410, and to transmit indications of rewards to the usage monitor computing device 104 based on the usage records.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

Further details of the functionality of the components of the monitoring server device 106 are provided below.

Figure 5A:
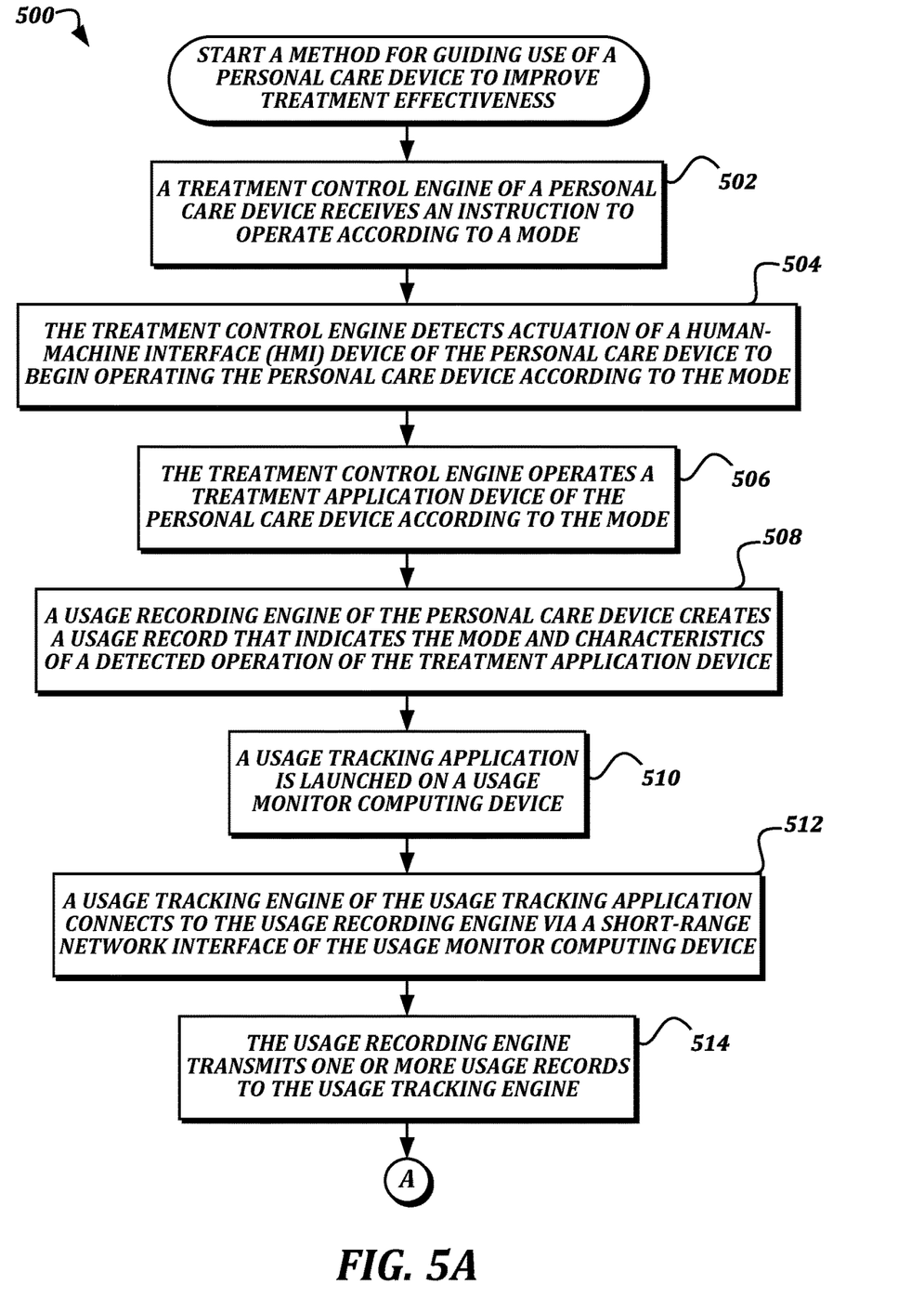
FIGS. 5A-5C are a flowchart that illustrates an example embodiment of a method for guiding use of a personal care device to improve treatment effectiveness according to various aspects of the present disclosure.
Figure 5B:
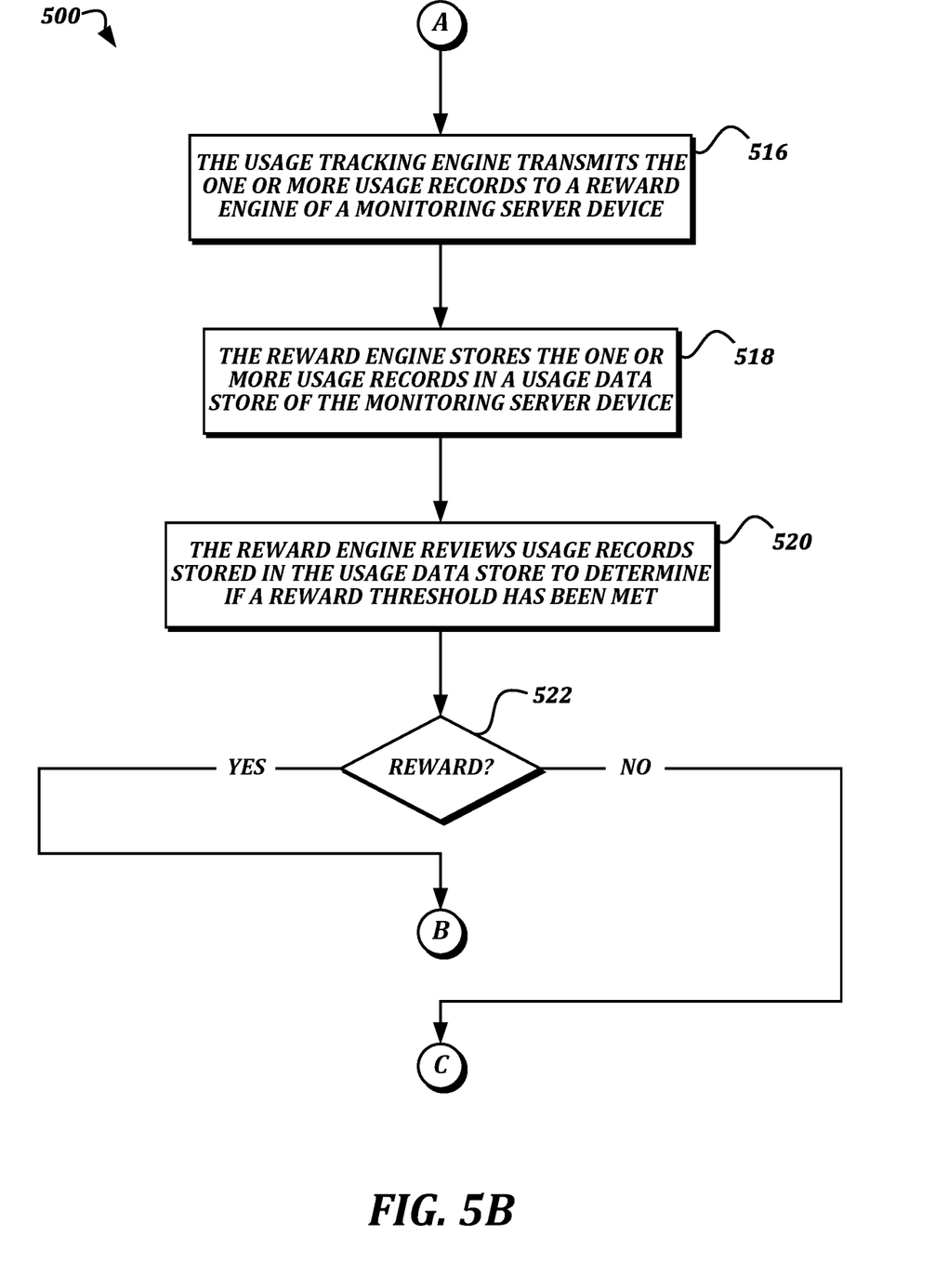

FIGS. 5A-5B are a flowchart that illustrates an example embodiment of a method for guiding use of a personal care device to improve treatment effectiveness according to various aspects of the present disclosure. From a start block, the method 500 proceeds to block 502, where a treatment control engine 218 of a personal care device 102 receives an instruction to operate according to a mode. In some embodiments, the mode may include one or more configuration settings including but not limited to an amount of time to operate the treatment application device 202, a power level or intensity at which to operate the treatment application device 202, a pattern with which to operate the treatment application device 202, or any other setting for operation of the treatment application device 202. In some embodiments, the instruction may be received via the network interface 212, or may be pre-programmed and stored in the computer-readable medium 214.

At block 504, the treatment control engine 218 detects actuation of a human-machine interface (HMI) device 206 of the personal care device 102 to begin operating the personal care device 102 according to the mode. For example, if the HMI device 206 is a push-button switch, the treatment control engine 218 may receive a signal that indicates that the push-button switch was pressed.

At block 506, the treatment control engine 218 operates a treatment application device 202 of the personal care device 102 according to the mode. For example, if the treatment application device 202 includes a drive motor, the treatment control engine 218 may start operating the drive motor using a power or intensity specified by the mode for an amount of time specified by the mode. As another example, if the treatment application device 202 includes a light, the treatment control engine 218 may cause the light to be activated at an intensity and/or wavelength specified by the mode for an amount of time specified by the mode.

At block 508, a usage recording engine 216 of the personal care device 102 creates a usage record that indicates the mode and characteristics of a detected operation of the treatment application device 202. For example, the usage record may include information such as the power or intensity, the amount of time the mode had specified the treatment application device 202 should be activated, and the amount of time for which the treatment application device 202 was actually active (in case operation of the treatment application device 202 was halted before the automatic shut-off time specified by the mode).

At block 510, a usage tracking application 312 is launched on a usage monitor computing device 104. In some embodiments, a user may launch the usage tracking application 312 by tapping, clicking, or otherwise interacting with an icon representing the usage tracking application 312. In some embodiments, the usage monitor computing device 104 may automatically launch the usage tracking application 312 in response to receiving a signal from the personal care device 102.

At block 512, a usage tracking engine 314 of the usage tracking application 312 connects to the usage recording engine 216 via a short-range network interface 302 of the usage monitor computing device 104. In some embodiments, the connection may include conducting a pairing process between the personal care device 102 and the usage monitor computing device 104, such as Bluetooth pairing. In some embodiments, a pairing process may have been conducted previously, and the connection created in block 512 is a new active connection. In some embodiments, the personal car device 102 and the usage monitor computing device 104 may be communicating before the usage tracking application 312 is launched.

At block 514, the usage recording engine 216 transmits one or more usage records to the usage tracking engine 314. In some embodiments, the one or more usage records may simply include the usage record created in block 508. In some embodiments, the one or more usage records may include multiple records, particularly if multiple activations of the treatment application device 202 have occurred before the usage tracking application 312 is launched.

The method 500 then proceeds to a continuation terminal ("terminal A"). From terminal A (FIG. 5B), the method 500 proceeds to block 516, where the usage tracking engine 314 transmits the one or more usage records to a reward engine 408 of a monitoring server device 106. In some embodiments, the transmission of the one or more usage records may occur via the long-range network interface 304. At block 518, the reward engine 408 stores the one or more usage records in a usage data store 410 of the monitoring server device 106.

At block 520, the reward engine 408 reviews usage records stored in the usage data store 410 to determine if a reward threshold has been met. In some embodiments, the usage records that are reviewed may include the usage records stored in block 518, as well as previously stored usage records. In some embodiments, the review of usage records may occur in response to storage of the usage records in block 518, may occur periodically, or may occur in response to any other condition.

The reward threshold may be any suitable threshold value to which the usage records may be compared. In some embodiments, the reward threshold may be related to a cumulative amount of time that the treatment application device 202 was active. In some embodiments, the reward threshold may be related to a cumulative number of times that the treatment application device 202 was activated regardless of elapsed active time. In some embodiments, the reward threshold may be related to a cumulative number of times that the treatment application device 202 was allowed to run for a complete cycle as indicated by the mode used during activation. For example, if a mode indicated that the treatment application device 202 should be activated for 60 seconds, the reward threshold may be related to the cumulative number of times that the treatment application device 202 was allowed to run for the full 60 seconds (instead of being manually deactivated before the full two minutes elapsed). In some embodiments, the reward threshold may be related to usage patterns over a period of time, as opposed to cumulative usage. For example, a first reward threshold may be related to whether the treatment application device 202 ran for a full cycle at least once a day for a week, a month, or any other time period. Other amounts of usage may be related to other reward thresholds; for example, a second reward threshold may be related to whether the treatment application device 202 ran for a full cycle at least twice a day (instead of once a day) for a week, a month, or any other time period. In some embodiments, the reward thresholds may be based on an aspect of the treatment application device 202. For example, a treatment application device 202 that uses interchangeable applicators may have different reward thresholds for different interchangeable applicators based on recommended usage profiles for the different applicators.

The method 500 then proceeds to a decision block 522, where a determination is made regarding whether a reward has been earned based on the reward thresholds analyzed in block 520. If no reward threshold has been met, then the result of decision block 522 is NO, and the method 500 proceeds to a first continuation terminal ("terminal B"). From terminal B (FIG. 5C), the method 500 proceeds to block 530. At block 530, the reward engine 408 transmits a notification of a reward threshold deficiency associated with the reward threshold to the usage monitor computing device 104, and at block 532, an interface engine 316 of the usage monitor computing device 104 presents the reward threshold deficiency. The reward threshold deficiency may be the difference between the reward threshold and the usage indicated by the usage records. For example, if the reward threshold measures usage for seven consecutive days and the usage records only show usage for five consecutive days, the reward threshold deficiency may indicate that two more consecutive days of usage must be recorded before the reward is provided. The reward threshold deficiency, when presented, may indicate the reward that will be provided upon making up the reward threshold deficiency.

Returning to decision block 522 (FIG. 5B), if a reward threshold has been met, then the result of decision block 522 is YES, and the method 500 proceeds to a second continuation terminal ("terminal C"). From terminal C (FIG. 5C), the method 500 proceeds to block 524. At block 524, the reward engine 408 transmits a notification of a reward associated with the reward threshold to the usage monitor computing device 104, and at block 526, an interface engine 316 of the usage monitor computing device 104 presents the reward. In some embodiments, the reward may include achievements or badges associated with an account of the user that may be presented to the user and/or others. In some embodiments, the reward may include points that can be exchanged for discounts, special offers, or other goods or services. In some embodiments, the reward may include unlocking functionality of the usage monitor computing device 104 and/or the personal care device 102. For example, a reward may allow the user to create custom modes to be executed by the treatment control engine 218, may allow the user to change background colors or other aspects of the usage tracking application 312, may allow the user to change a color of an LED of the personal care device 102, or any other mutable functionality of the personal care device 102 or the usage monitor computing device 104. In some embodiments, such as those wherein the personal care device 102 includes a loudspeaker 208, the notification of the reward may be presented by the loudspeaker 208 instead of by the usage monitor computing device 104.

Figure 5C:
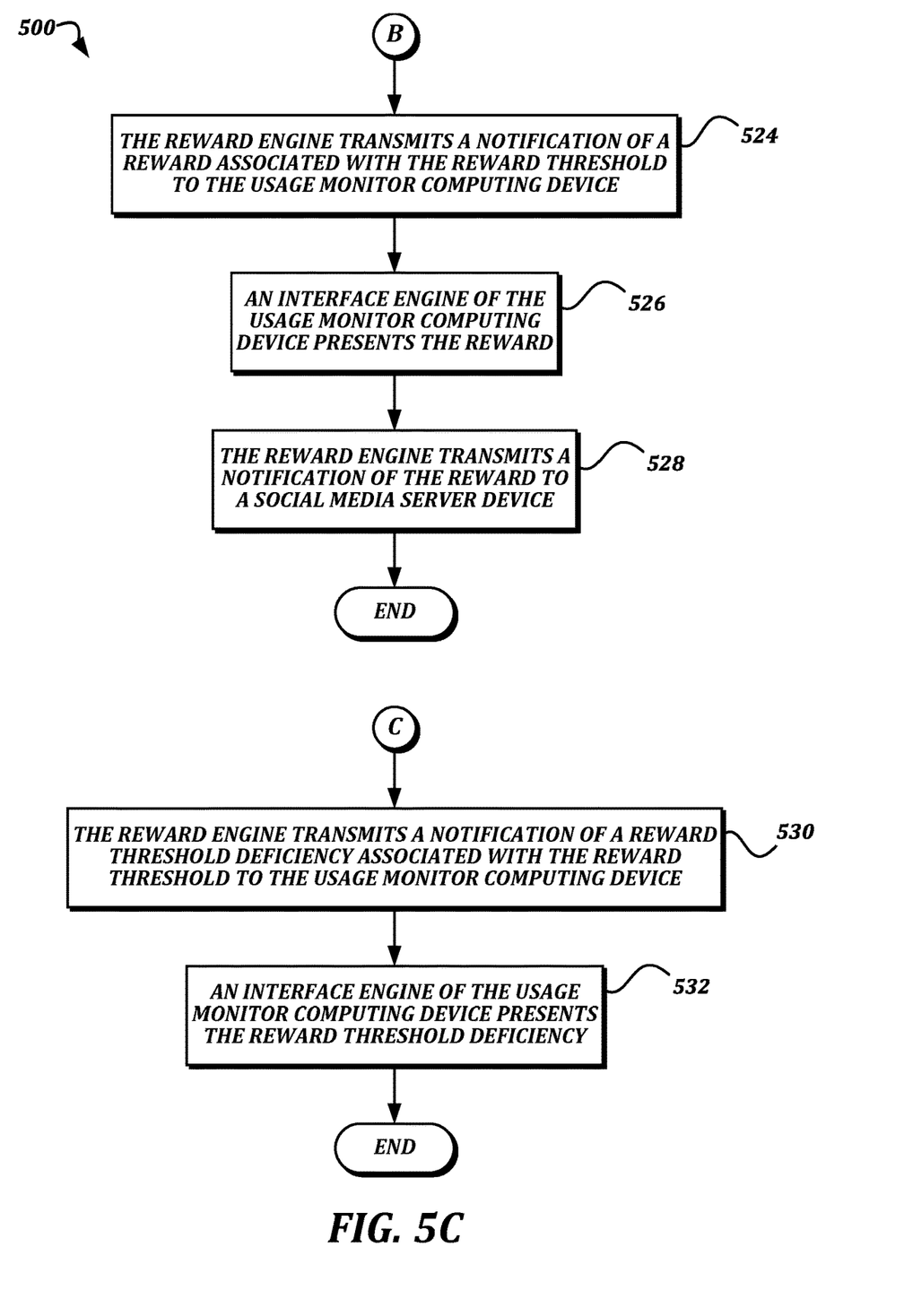

At block 528, the reward engine 408 transmits a notification of the reward to a social media server device 108. In some embodiments, the notification of the reward may be a social media post that describes the reward and/or how the reward was earned. In some embodiments, the social media post may reference a social media account of the user, but may be posted by a social media account associated with the monitoring server device 106. In some embodiments, the monitoring server device 106 may have permission to post as the social media account of the user, and the social media post that includes the notification of the reward may be posted by the monitoring server device 106 using the social media account of the user. In some embodiments, engagements with the social media post may be tracked by the monitoring server device 106 and may be used to provide additional rewards.

The method 500 then proceeds to an end block and terminates.

In the embodiments illustrated and described above, the personal care device 102 communicates with the monitoring server device 106 via the usage monitor computing device 104. However, in other embodiments, the personal care device 102 may communicate directly with the monitoring server device 106, or may communicate with the monitoring server device 106 via an intermediate device with less functionality than illustrated in the usage monitor computing device 104 (such as an internet-of-things (IoT) hub). In such embodiments, functionality described above as being performed by the usage monitor computing device 104 (other than the information relay functionality) may be subsumed into the monitoring server device 106.

Figure 6:
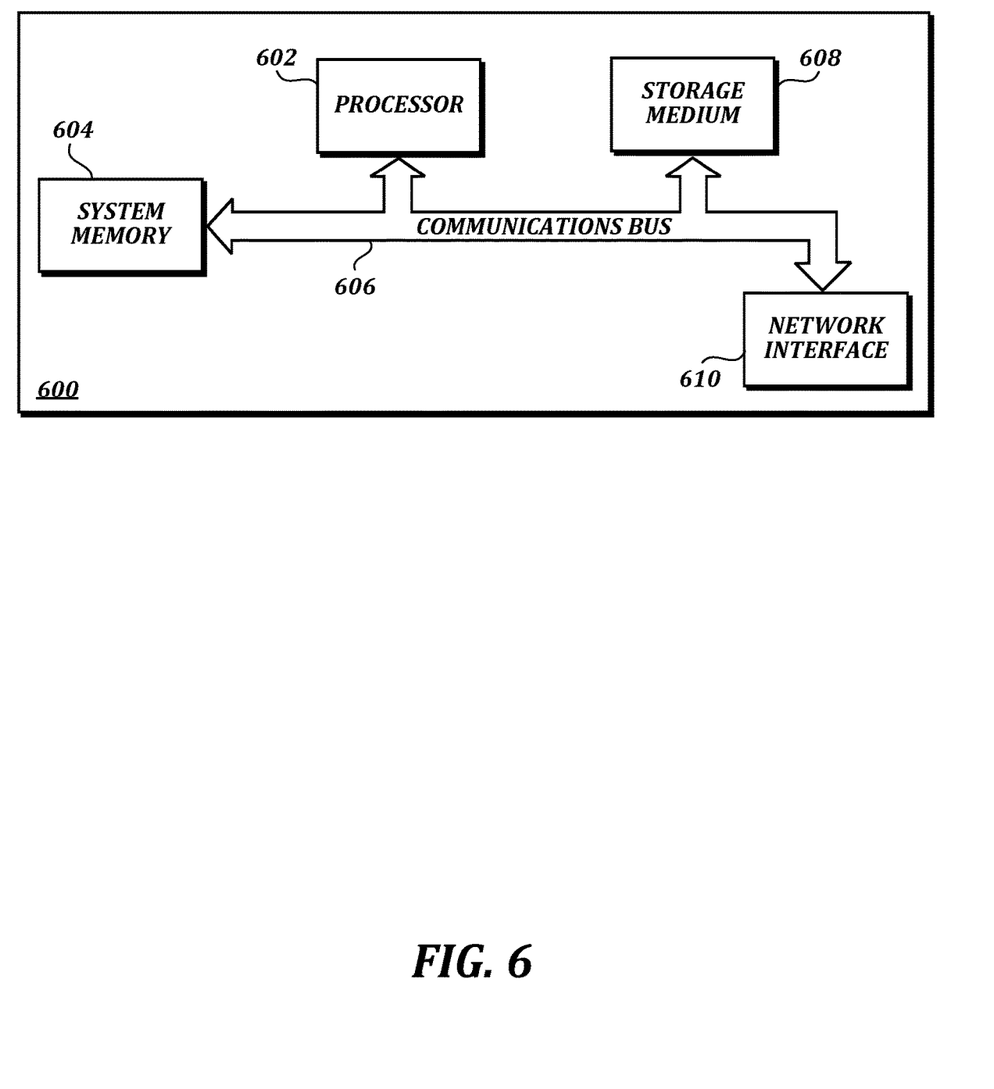
FIG. 6 is a block diagram that illustrates aspects of an exemplary computing device appropriate for use with embodiments of the present disclosure.

FIG. 6 is a block diagram that illustrates aspects of an exemplary computing device appropriate for use with embodiments of the present disclosure. While FIG. 6 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 600 may be any one of any number of currently available or yet to be developed devices.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or similar memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as WiFi, 2G, 3G, 4G, LTE, WiMAX, Bluetooth, and/or the like.

In the exemplary embodiment depicted in FIG. 6, the computing device 600 also includes a storage medium 608. However, services may be accessed using a computing device that does not include means for persisting data to a local storage medium. Therefore, the storage medium 608 depicted in FIG. 6 is represented with a dashed line to indicate that the storage medium 608 is optional. In any event, the storage medium 608 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 604 and storage medium 608 depicted in FIG. 6 are merely examples of computer-readable media.

Suitable implementations of computing devices that include a processor 602, system memory 604, communication bus 606, storage medium 608, and network interface 610 are known and commercially available. For ease of illustration and because it is not important for an understanding of the claimed subject matter, FIG. 6 does not show some of the typical components of many computing devices. In this regard, the computing device 600 may include input devices, such as a keyboard, keypad, mouse, microphone, touch input device, touch screen, tablet, and/or the like. Such input devices may be coupled to the computing device 600 by wired or wireless connections including RF, infrared, serial, parallel, Bluetooth, USB, or other suitable connections protocols using wireless or physical connections. Similarly, the computing device 600 may also include output devices such as a display, speakers, printer, etc. Since these devices are well known in the art, they are not illustrated or described further herein. Unless specifically defined herein, all terms used herein have the same meaning as they would to one skilled in the art of the present disclosure.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for guiding use of a personal care device to improve treatment effectiveness, the system comprising:
a personal care device;
a usage monitor computing device; and
a monitoring server device;

wherein the personal care device is communicatively coupled to the usage monitor computing device;
wherein the usage monitor computing device is communicatively coupled to the monitoring server device and is configured to:
  determine an identification of a consumable used along with the personal care device during a detected operation based on a captured image of the consumable or of packaging of the consumable;
  transmit a usage record to the monitoring server device, wherein the usage record includes information regarding the detected operation of a treatment application device of the personal care device and includes the identification of the consumable;
wherein the monitoring server device is configured to:
  receive the usage record from the usage monitor computing device;
  store the usage record in a usage data store;
  review a plurality of usage records stored in the usage data store to determine if a reward threshold has been met; and
  in response to determining that the reward threshold has been met, transmit a notification of a reward to the usage monitor computing device for presentation; and
wherein the personal care device is configured to:
  enable functionality of the personal care device based on the reward, wherein the functionality includes an ability to create custom modes for operation of the treatment application device.

2. The system of claim 1, wherein the personal care device is communicatively coupled to the usage monitor computing device via a short-range network, and wherein the usage monitor computing device is communicatively coupled to the monitoring server device via a long-range network.

3. The system of claim 1, wherein the usage record includes treatment cycle definition information.

4. The system of claim 3, wherein the reward threshold includes a threshold number of times during a given time period that a detected operation constituted a complete treatment cycle according to the treatment cycle definition information, and wherein the threshold number of times is two or more.

5. The system of claim 1, wherein the reward includes at least one of a badge and an unlocked functionality of the usage monitor computing device or personal care device.

6. The system of claim 1, wherein the monitoring server device is further configured to, in response to determining that the reward threshold has been met, automatically transmit a message to a social media server device.

7. The system of claim 1, wherein the ability to create custom modes for operation of the treatment application device includes at least one of:
  creating a custom mode that specifies an amount of time to operate the treatment application device;
  creating a custom mode that specifies a power level or intensity at which to operate the treatment application device; and
  creating a custom mode that specifies a pattern with which to operate the treatment application device.

8. A method of guiding use of a personal care device to improve treatment effectiveness, the method comprising:
  receiving a usage record that includes information regarding a detected operation of a treatment application device of the personal care device;
  determining an identification of a consumable used along with the personal care device during the detected operation based on a captured image of the consumable or of packaging of the consumable;
  adding the identification of the consumable to the usage record;
  determining a reward based on the usage record;
  presenting an indication of the reward; and
  enabling functionality of the personal care device based on the reward, wherein the enabled functionality includes an ability to create custom modes for operation of the treatment application device.

9. The method of claim 8, wherein receiving the usage record includes receiving treatment cycle definition information.

10. The method of claim 9, wherein receiving treatment cycle definition information includes receiving information regarding an expected duration for which the treatment application device should be detected as operating to be considered a complete treatment cycle.

11. The method of claim 8, wherein determining the consumable used along with the personal care device during the detected operation includes interrogating an RFID tag associated with the consumable.

12. The method of claim 8, wherein the ability to create custom modes for operation of the treatment application device includes at least one of:
  creating a custom mode that specifies an amount of time to operate the treatment application device;
  creating a custom mode that specifies a power level or intensity at which to operate the treatment application device; and
  creating a custom mode that specifies a pattern with which to operate the treatment application device.

13. A usage monitor computing device, comprising:
  a display device;
  circuitry for receiving a usage record that includes information regarding a detected operation of a treatment application device of a personal care device;
  circuitry for capturing an image of a consumable or of a packaging of a consumable used along with the personal care device during the detected operation;
  circuitry for determining an identification of the consumable based on a captured image of the consumable or of packaging of the consumable;
  circuitry for adding the identification of the consumable to the usage record;
  circuitry for transmitting the usage record to a monitoring server device;
  circuitry for receiving a notification of a reward based on the usage record from the monitoring server device;
  circuitry for presenting an indication of the reward on the display device; and
  circuitry for enabling functionality of the personal care device based on the reward, wherein the enabled functionality includes an ability to create custom modes for operation of the treatment application device.

14. The usage monitor computing device of claim 13, wherein the usage record includes treatment cycle definition information, and wherein the treatment cycle definition information includes an expected duration for which the treatment application device should be detected as operating to be considered a complete treatment cycle.

15. The usage monitor computing device of claim 13, wherein the circuitry for determining the consumable used along with the personal care device during the detected operation includes circuitry for interrogating an RFID tag associated with the consumable.

16. The device of claim 13, wherein the ability to create custom modes for operation of the treatment application device includes at least one of:
- creating a custom mode that specifies an amount of time to operate the treatment application device;
- creating a custom mode that specifies a power level or intensity at which to operate the treatment application device; and
- creating a custom mode that specifies a pattern with which to operate the treatment application device.

\* \* \* \* \*